United States Patent
Geyer

(10) Patent No.: US 7,337,882 B2
(45) Date of Patent: Mar. 4, 2008

(54) LINEAR ELECTROMECHANICAL SCREW ACTUATOR FOR PARKING BRAKE

(75) Inventor: Andreas Geyer, San Secondo Di Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 145 days.

(21) Appl. No.: 10/525,091

(22) PCT Filed: Jul. 5, 2004

(86) PCT No.: PCT/EP2004/007316

§ 371 (c)(1),
(2), (4) Date: Feb. 23, 2005

(87) PCT Pub. No.: WO2005/005212

PCT Pub. Date: Jan. 20, 2005

(65) Prior Publication Data

US 2006/0201758 A1  Sep. 14, 2006

(30) Foreign Application Priority Data

Jul. 7, 2003  (IT)  ............... TO20030106 U

(51) Int. Cl.
*F16D 55/08* (2006.01)
*F16D 65/14* (2006.01)

(52) U.S. Cl. .................... 188/72.8; 188/2 D

(58) Field of Classification Search ............. 188/71.9, 188/156, 2 D, 72.8; 303/20; 74/89.23, 89.36, 74/474.71, 509, 505.5
See application file for complete search history.

(56) References Cited

U.S. PATENT DOCUMENTS

| | | | | |
|---|---|---|---|---|
| 4,006,802 A | * | 2/1977 | Evans | 188/196 D |
| 5,178,237 A | * | 1/1993 | Ursel et al. | 188/106 P |
| 5,180,038 A | * | 1/1993 | Arnold et al. | 188/171 |
| 6,145,634 A | * | 11/2000 | Holding | 188/72.8 |
| 6,158,822 A | * | 12/2000 | Shirai et al. | 303/3 |
| 6,655,507 B2 | * | 12/2003 | Miyakawa et al. | 188/171 |
| 2002/0100647 A1 | * | 8/2002 | Miyakawa et al. | 188/162 |

FOREIGN PATENT DOCUMENTS

| | | |
|---|---|---|
| EP | 1 211 149 A | 6/2002 |
| FR | 2 812 056 A | 1/2002 |
| GB | 2 304 838 A | 3/1997 |

* cited by examiner

*Primary Examiner*—Robert A. Siconolfi
*Assistant Examiner*—James Hsiao
(74) *Attorney, Agent, or Firm*—Sughrue Mion, PLLC

(57) ABSTRACT

A linear electromechanical actuator of the screw type for a parking brake including a tubular nut (22) coupled by means of an external thread to the casing (12) of the actuator and operated to perform a screwing movement about and along a longitudinal axis (x). The nut has an internal thread (23) opposite the external thread, for engaging a threaded rod (11) which is prevented from rotating with respect to the casing. Operation of the electrical motor (13) brings about a telescopic movement of the nut (22) and the rod (11) with respect to the casing (12), with a rapid linear translation of the rod (x).

14 Claims, 3 Drawing Sheets

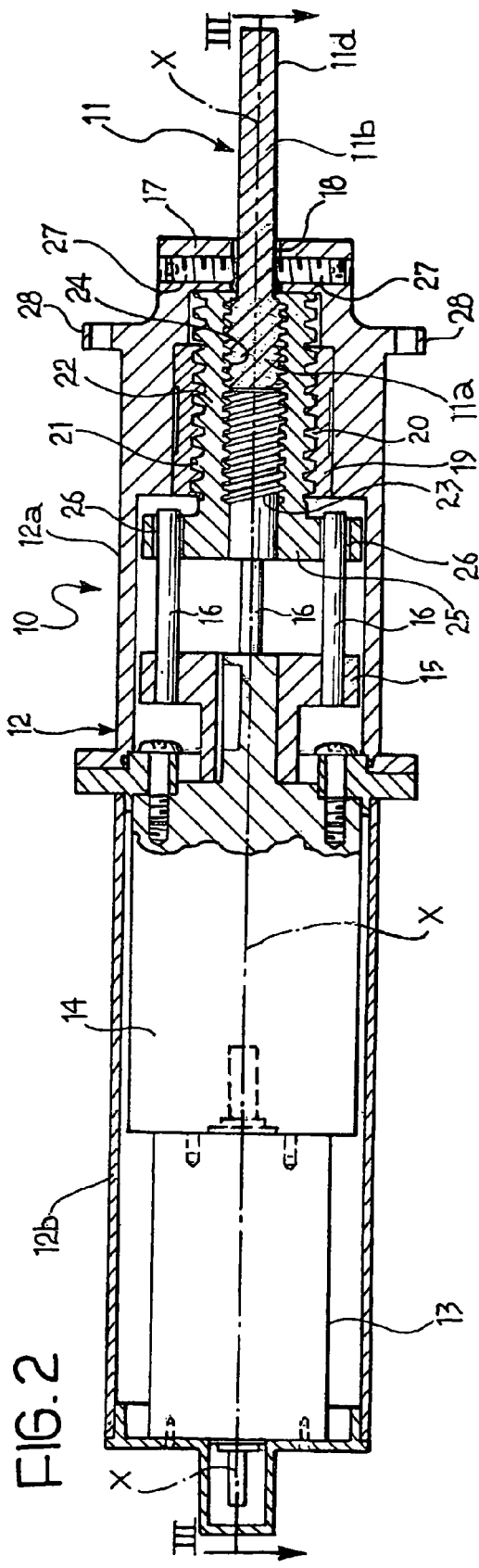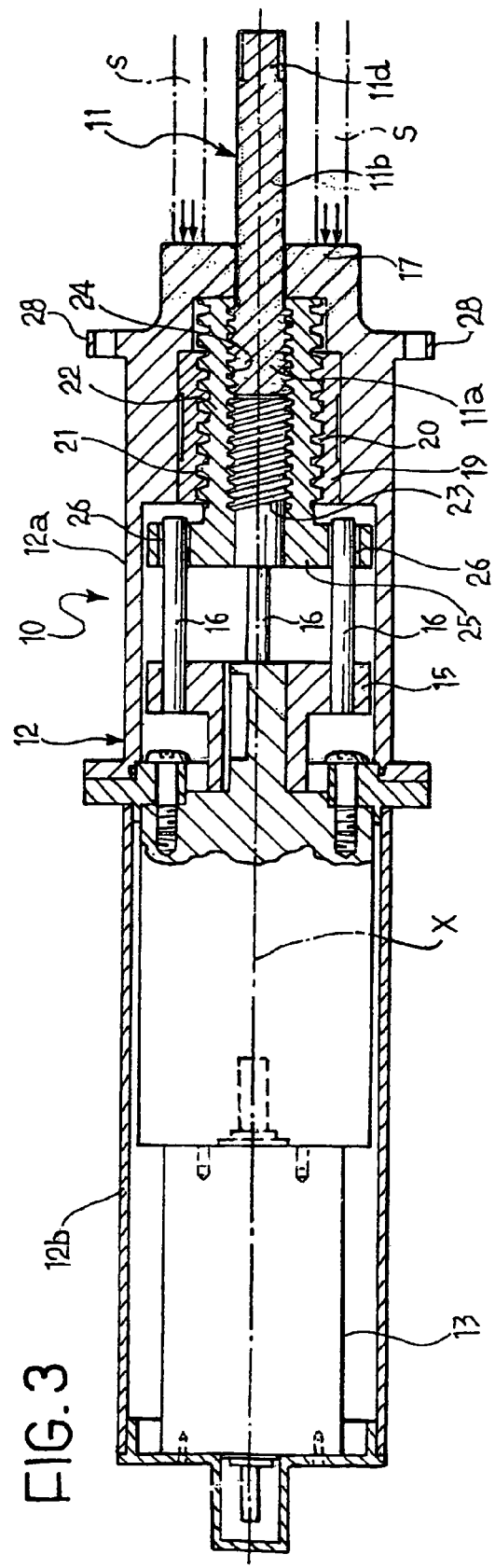

LINEAR ELECTROMECHANICAL SCREW ACTUATOR FOR PARKING BRAKE

This is a National Stage entry of International Application PCT/EP2004/007316, with an international filing date of Jul. 5, 2004, which was published under PCT Article 21(2) as WO/2005/005212 A1, and the complete disclosure of which is incorporated into this application by reference.

BACKGROUND OF THE INVENTION

The present invention relates to a linear electromechanical screw actuator for a parking brake of a motor vehicle.

Instead of the traditional manually operated lever which imparts a traction movement to one or two Bowden cables connected to the parking brakes of a motor vehicle, it has recently been proposed to effect that traction movement by means of an electromagnetic actuator (see, for example, US2002/0100647 A1).

SUMMARY OF THE INVENTION

The object of the invention is to provide a linear actuator capable of imparting to the Bowden cables a traction movement for a maximum travel of approximately 40 mm rapidly (less than 1.0-1.5 seconds), in a non-backdrivable manner (that is to say, capable of maintaining the imparted braking force in the absence of an unlocking command) and capable of exerting a high traction force of the order of approximately 3600 N.

Another object of the invention is to provide a strong and reliable linear actuator which is easy to mount and which is constituted by a minimum number of components.

A further particular object of the invention is to provide an actuator which is such that, when the braking force is applied, the path of forces and reactions which passes through that actuator involves a minimum number of components.

Those and other objects and advantages which will be better understood hereinafter are achieved according to the invention by a braking system and by an actuator according to the appended claims.

BRIEF DESCRIPTION OF THE DRAWINGS

A description will now be given of the structural and functional features of some preferred but non-limiting embodiments of a braking system and of an actuator according to the invention; reference is made to the appended drawings in which:

FIG. 2 is a view in longitudinal section of an actuator according to the invention;

FIG. 3 is a view in longitudinal section in accordance with the line III-III in FIG. 2;

DETAILED DESCRIPTION OF THE INVENTION

Figure 1:
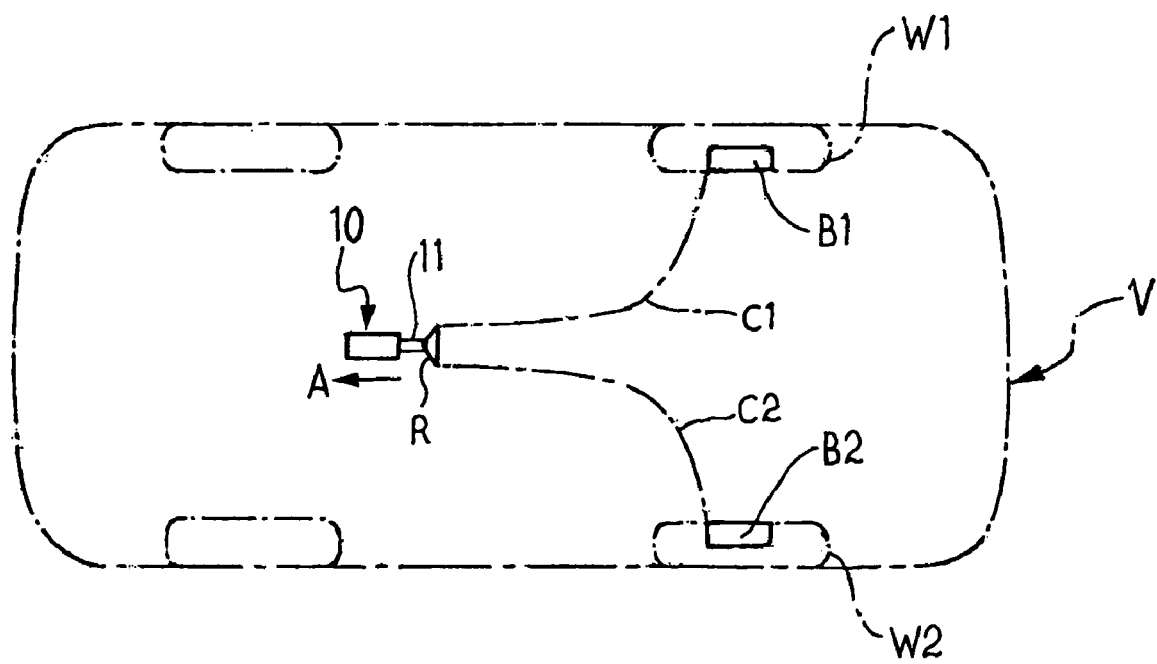
FIG. 1 is a diagrammatic plan view of a motor vehicle provided with a braking system having an actuator according to the invention.

Referring first of all to FIG. 1, a braking system of a motor vehicle comprises parking brakes B1 and B2 associated with the rear wheels W1 and W2 of a motor vehicle V. Each parking brake is operated by a respective Bowden cable C1, C2 constrained on a distributor R which, in order to operate the brakes, has to be pulled in the direction of the arrow A by a rod transmission element 11 at the output side of a linear electromechanical actuator generally indicated 10 and illustrated in FIGS. 2 to 4.

The actuator 10 has a substantially cylindrical rigid casing 12 defining a central longitudinal axis x which coincides with the direction of operation of the rod 11. The casing 12 is advantageously formed by joining two bodies 12a, 12b, of which the one body 12a located on the side where the rod 11 emerges is rigid while the complementary body 12b, which does not have to be subjected to appreciable stresses during use, can be thinner.

Mounted inside the casing is an electrical motor 13 with an associated reduction unit 14 whose rotary member at the output side comprises a radial flange 15 which is rotatable about the central axis x of the actuator. The flange 15 carries a plurality of axial pins 16, for example three or four parallel pins arranged in an angularly equidistant manner around the axis x.

Figure 4:
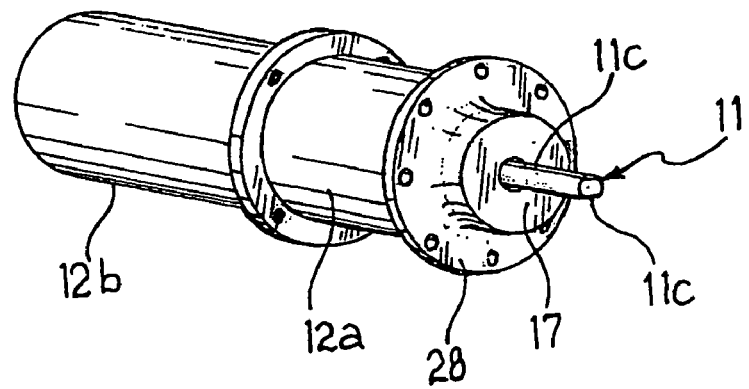
FIG. 4 is a perspective view of the actuator of FIGS. 2 and 3.

The head or output portion 12a of the casing 12 has an end transverse terminal wall 17 having a central opening 18 through which the rod 11 extends. Secured to the inside of the head portion 12a of the casing is a metal bush 19 which is threaded internally with a trapezial thread 20 with which engages the external thread 21 of a tubular nut element 22 having a trapezial internal thread 23 opposite the external thread 21 and coaxial therewith. The nut element 22 co-operates in a threaded manner with the rod 11, which has an axially internal (or proximal) portion 11a having a trapezial thread 24 which is congruent with the internal thread 23 of the nut, and an axially more external (or distal) portion 11b having a non-circular cross-section. For example, as shown in FIG. 4, the distal portion 11b which extends through the opening 18 in the transverse wall 17 of the casing has a prismatic shape or has one or more flat surfaces 11c, whose function is described hereinafter, and a terminal portion 11d for connection to the distributor R. As will be seen, the rod and the nut co-operate by performing a telescopic movement with respect to the fixed casing. As an alternative to the example illustrated, the thread 20 which is fixedly joined to the casing 12 could be formed in a single piece with the casing instead of being formed by a separate element (the bush 19).

The nut element 22 has a base portion in the form of a radial flange 25 in which are formed axially oriented through-openings 26 in which the pins 16 carried by the rotary member 15 engage slidingly.

In the region of the outlet opening 18 for the rod 11, the casing has means for preventing the rotation of the rod about the longitudinal axis of the actuator. Those anti-rotation means may be constituted by the opening 18 itself, which may have a non-circular shape corresponding to the cross-section of the distal portion 11b of the rod 11. Alternatively, the anti-rotation means could comprise one or more grub screws 27 (FIG. 2) which, by co-operating with the flat surfaces 11c of the rod 11, prevent the rotation thereof.

Figure 5:
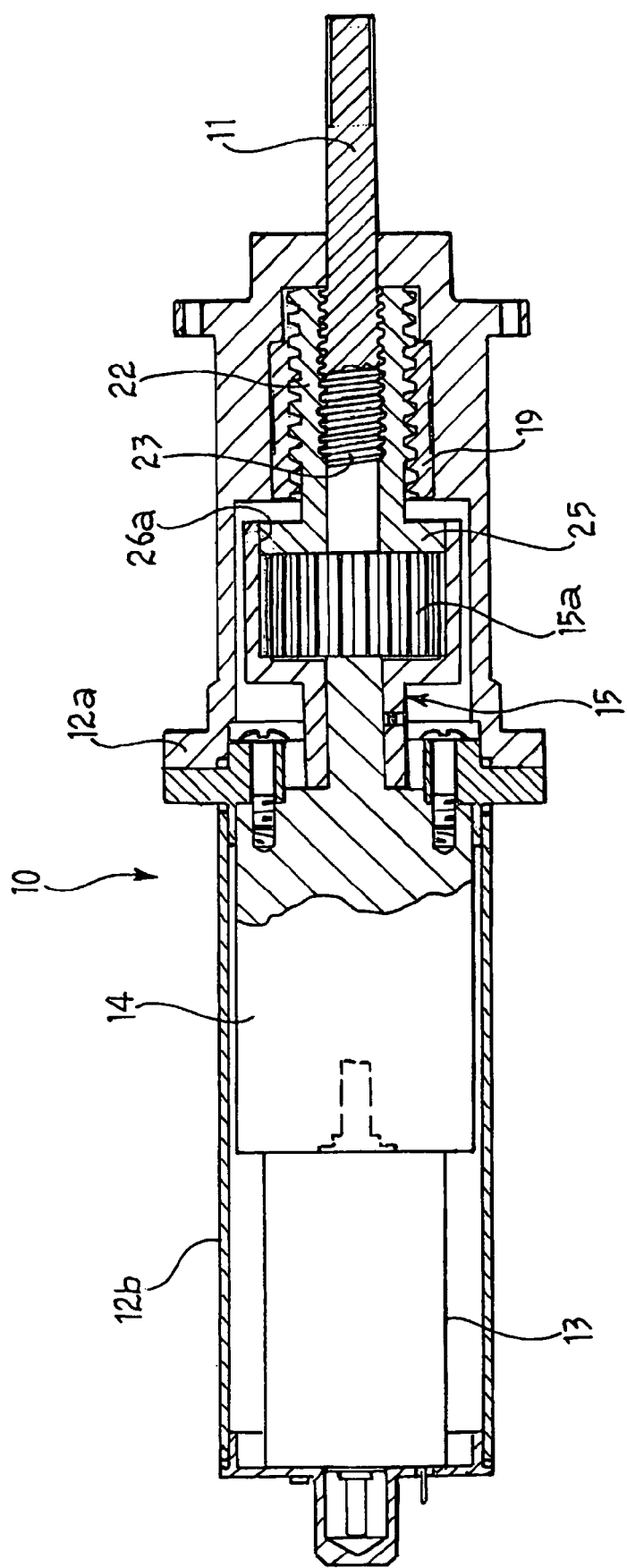
FIG. 5 is a view in longitudinal section of a variant of the actuator according to the invention.

In the alternative embodiment illustrated in FIG. 5, the rotary member 15 at the output side comprises a cylindrical seat having internal axial grooves 15a. A grooved peripheral portion 26a of the flange 25 of the nut 22 engages slidingly along those grooves.

When the electrical motor 13 is activated, the flanged member 15 causes the nut 22 to rotate relative to the threaded bush 19 and to the casing 12, so that the nut performs a screwing movement about and along the longitudinal axis x. Owing to the anti-rotation engagement between the rod and the casing, and owing to the internal threaded coupling between the nut and the rod, which, as stated, have respective threads 23 and 24 opposite those 20, 21 of the external threaded coupling between the nut 22 and the casing, the rotation of the nut brings about a rapid linear translation (without rotation) of the rod 11, which is rapidly retracted towards the inside of the actuator, thus operating the Bowden cables C1, C2 which control the parking brakes B1, B2. During the screwing movement about the axis x, the nut 22, with its flange 25, approaches (or moves away from, depending on the sense of rotation imparted by the motor) the rotary flange 15, by sliding on the axial pins 16 (or, in the variant of FIG. 5, by sliding along the axial grooves 15*a*).

It will be appreciated that, owing to the contribution made by the two threaded couplings, the speed of linear translation of the rod 11 is very high and therefore the parking brakes can be activated rapidly, despite the fact that the threads have small angles of inclination (preferably less than 14° and more preferably of approximately 8°) in order to render the system non-backdrivable. It is desired that, owing to the wear between the mobile portions of the actuator, the rod should be capable of maintaining the retracted position reached and avoiding a situation where, in the absence of an operating command, the rod may be removed from the casing, for example if the vehicle V is parked on a slope.

The reaction forces transmitted in return to the actuator during braking may be discharged to the outside (onto a fixed component of the vehicle) by way of a flange 28 formed near the region where the rod emerges from the rigid portion 12*a* of the casing or, alternatively, as illustrated with a broken line in FIG. 3, by way of the transverse end wall 17 of the casing, which acts as a check surface for a rigid sheath S which surrounds the rod and which is secured at its opposite end to the vehicle at a point (not illustrated) remote from the actuator. That variant advantageously enables the actuator to be arranged at any point in the vehicle, that is to say, even where there are no particularly rigid anchoring points present.

Owing to the proximity of the threaded members to the check portions or surfaces 17 and 28, the path of the forces acting on the actuator when the latter is activated affects few members (the rod, the nut, the threaded bush and the casing) and those forces are discharged to the outside of the actuator without stressing the reduction unit 14 or the electrical motor 13. This is advantageous if it is considered that the braking forces (of the order of approximately 3600 N) would inevitably increase the clearance between the transmission members of the reduction unit and the motor, thus reducing the service life of the actuator. The small number of members affected by the braking forces instead defines a very short kinematic chain which guarantees the reliability of the actuator over time.

The invention claimed is:

1. A braking system for a parking brake of a motor vehicle, comprising:
    at least one flexible cable (C1, C2) for transmitting a braking operating force to at least one parking brake (B1, B2) and
    a linear electromechanical actuator (10), which includes:
        a stationary rigid casing (12) defining a longitudinal axis (x),
        motor means (13, 14) for imparting to a rotary member (15) a rotational movement about said axis (x),
        a tubular nut element (22) coupled in rotation to the rotary member (15) so as to be rotatable therewith and having an external thread (21) co-operating with a thread (20) fixedly joined to the casing (12) in order to move the nut along said axis, and an internal thread (23) opposite the external thread (21),
        a longitudinal rod (11) having a means (11*d*) for connection to the flexible cable (C1, C2), a first portion (11*a*) which is threaded (24) and which co-operates with the internal thread (23) of the nut (22), and a second portion (11*b*) having a non-circular cross-section (11*c*),
        anti-rotation means (18, 27) co-operating between the casing (12) and the second portion (11*b*) of the rod (11) to prevent the rotation of the rod about said axis so that the rod (11) is translatable longitudinally along said axis in response to the rotary movement imparted by the motor means (13, 15).

2. A braking system according to claim 1, wherein the rigid casing (12*a*), in a region near the thread (20) fixedly joined thereto, has check means (28, 17) for transferring to the vehicle forces and reactions transmitted from the rod (11) to the actuator (10) when the actuator is operated.

3. A braking system according to claim 1, wherein the check means comprise a flange (28) formed by the casing (12*a*) near the region where the rod (11) emerges from the casing.

4. A braking system according to claim 1, wherein the check means comprise a rigid transverse end wall (17) of the casing, which wall can act as a check surface for a rigid sheath (S) which surrounds the rod (11).

5. A braking system according to claim 1, wherein the anti-rotation means comprise at least one element (27) arranged transversely in the casing to co-operate with at least one substantially flat surface (11*c*) of the second portion (11*b*) of the rod (11) in order to prevent the rotation of the rod about said axis (x).

6. A braking system according to claim 1, wherein the anti-rotation means comprise a non-circular opening (18) formed in a transverse wall (17) of the casing (12*a*) and capable of co-operating with the second portion (11*b*) of the rod (11), which portion has a non-circular cross-section, in order to prevent the rotation of the rod about said axis (x).

7. A braking system according to claim 1, comprising a plurality of longitudinal pins (16) acting between the rotary member (15) and the nut element (22) in order to fix the nut (22) in rotation with the rotary member (15) and to enable the nut to move in translation longitudinally with respect to the rotary member (15).

8. A braking system according to claim 7, wherein the longitudinal pins (16) are carried by the rotary member (15) and they engage slidingly in respective longitudinal seats (26) formed by the nut element (22).

9. A braking system according to claim 1, comprising a grooved coupling (15*a*, 26*a*) between the rotary member (15) and the nut element (22) in order to fix the nut (22) in rotation with the rotary member (15) and to enable the nut to move in translation longitudinally with respect to the rotary member (15).

10. A braking system according to claim 1, wherein the thread (20) fixedly joined to the casing (12), and the corresponding external thread (21) of the nut (22) are trapezial threads.

11. A braking system according to claim 1, wherein the thread (20) fixedly joined to the casing is formed by a bush (19) secured to the inside of the casing (12).

12. A braking system according to claim 1, wherein the internal thread (23) of the nut (22) and the corresponding thread (24) of the rod (11) are trapezial threads.

13. A braking system according to claim 1, wherein the internal thread (23) and the external thread (21) of the nut (22) are coaxial.

14. A braking system according to claim 2, wherein the casing (12) of the actuator (10) comprises a more rigid portion (12a) which forms the check means (28, 17) and which is secured to a less rigid portion (12b).

* * * * *

UNITED STATES PATENT AND TRADEMARK OFFICE
CERTIFICATE OF CORRECTION

PATENT NO.         : 7,337,882 B2                                    Page 1 of 1
APPLICATION NO. : 10/525091
DATED              : March 4, 2008
INVENTOR(S)        : Andreas Geyer It is certified that error appears in the above-identified patent and that said Letters Patent is hereby corrected as shown below:

On the Title page, item [73] should read
-- Assignee:   Aktiebolaget SKF Göteborg --.

Signed and Sealed this

Twelfth Day of August, 2008

JON W. DUDAS
*Director of the United States Patent and Trademark Office*